(12) United States Patent
Liu

(10) Patent No.: US 6,957,282 B2
(45) Date of Patent: Oct. 18, 2005

(54) OPTICAL DISK DRIVE CONTROL APPARATUS

(75) Inventor: Hsin Liu, Taoyuan Hsien (TW)

(73) Assignee: Quanta Storage, Inc., Taoyuan Hsien (TW)

(*) Notice: Subject to any disclaimer, the term of this patent is extended or adjusted under 35 U.S.C. 154(b) by 202 days.

(21) Appl. No.: 10/436,277

(22) Filed: May 12, 2003

(65) Prior Publication Data

US 2004/0039852 A1 Feb. 26, 2004

(30) Foreign Application Priority Data

Aug. 7, 2002 (TW) ........................................ 91212201 U

(51) Int. Cl.⁷ ................................................ G06F 3/00
(52) U.S. Cl. ........................ 710/5; 710/16; 710/17; 710/18; 710/38
(58) Field of Search .......................... 710/5, 16, 17, 710/18, 38, 65, 74

(56) References Cited

U.S. PATENT DOCUMENTS

| | | | |
|---|---|---|---|
| 5,483,260 A | * | 1/1996 | Parks et al. ................. 345/156 |
| 5,838,983 A | | 11/1998 | Atkinson ............... 395/750.06 |
| 5,910,933 A | * | 6/1999 | Moore ........................... 369/2 |
| 6,047,381 A | * | 4/2000 | Klein ......................... 713/501 |
| 6,711,631 B1 | * | 3/2004 | Chan et al. ................... 710/14 |
| 2002/0052990 A1 | * | 5/2002 | Chan et al. ................... 710/73 |

FOREIGN PATENT DOCUMENTS

JP 09006501 A * 1/1997 ............. G06F/3/00

* cited by examiner

Primary Examiner—Jeffrey Gaffin
Assistant Examiner—Alan S Chen
(74) Attorney, Agent, or Firm—Thomas, Kayden, Horstemeyer & Risley

(57) ABSTRACT

An optical disk drive control apparatus, which enables the operation of the optical disk drive during the power-off state or a power-saving mode (low-power suspend mode), is provided. The notebook computer comprises an other-function chip with idle pins. The idle pins are connected to the optical disk drive via signal lines to control the operation of the optical disk drive. Moreover, in order to detect control signals transmitted from the other-function chip, a signal-processing device can be used to converting the control signals to be compliant with the ATAPI standard. Alternative ways, like setting up a protocol for the other-function chip and the optical disk drive and table lookup, also enable the control signals from the standard interface to be detected without an additional signal transformation procedure.

10 Claims, 1 Drawing Sheet

OPTICAL DISK DRIVE CONTROL APPARATUS

This application claims the benefit of Taiwan application Serial No. 91212201, filed Aug. 7, 2002.

BACKGROUND OF THE INVENTION

1. Field of the Invention

The invention relates in general to a control apparatus, and more particularly to a control apparatus for an optical disk drive.

2. Description of the Related Art

The advance of notebook computers leads to their popularity. Besides having the function of executing application programs, most of the notebook computers are equipped with multimedia functions, which greatly add their value of utilization. An optical disk drive, such as CD-ROM and DVD-ROM, is indispensable for multimedia applications. The notebook computers can be used to utilize multimedia player software to play audio music CDs in an operating system such as Windows. The current advance enables user to operate the optical disk drive while the computer system is power-off. Operating the optical disk drive during the power-off state is commonly called as "Audio DJ function", which is fairly user friendly.

Conventionally, the operation of the optical disk drive is controlled by an optical disk drive control chip installed in the notebook computer. Referring to FIG. 1, a block diagram illustrating a conventional control method for the optical disk drive is shown. Herein and in most conventional cases, ATAPI (Advanced Technology Attachment Packet Interface) interface is applied. The optical disk drive 15 is controlled according to the control signal Ctrl received by an optical disk drive control chip 11 and transmitted via the ATAPI. There are a variety of control signals, such as play/pause, stop, FF, REW, etc. ATAPI, which is specially designed for the optical disk drive 15, is integrated with the optical disk drive control chip 11 and thus became one of the indispensable costs. Therefore, it is against the market trend of cost reduction.

The current notebook computer with the function of Audio DJ is usually configured with several control buttons on its housing. The control buttons, such as play/pause, stop, FF, REW, or eject, control the operation of the optical disk drive. The control buttons on the housing of the notebook computer provide an easy and convenient way for users to enjoy the multimedia function. However, by all means the configuration of the buttons creates and increases higher production cost. In addition, the pleasant appearance design of the notebook computer is spoiled due to the additional buttons. Hence, it is a pity to have inevitable shortcomings despite no doubt the method provides a handy way for users to execute the optical disk drive.

SUMMARY OF THE INVENTION

In the light of the above-mentioned shortcomings, it is therefore an object of the invention to provide an optical disk drive control apparatus. The invention applies an other-function chip, which already exists in the notebook computer and has functions other than optical disk drive control, to replace the normal disk drive control chip. As a result, the production cost is reduced and the product fabricated according to this invention is much more competitive in the market.

According to an object of the invention, the control apparatus for an optical disk drive is provided. The control apparatus is briefly described as follows.

The control apparatus for the optical disk drive according to the invention is provided for a user to operate the optical disk drive when the notebook computer is in a power-off state or in a power-saving mode (low-power suspend mode). The notebook computer is equipped with an other-function chip having idle pins, and also the idle pins are connected to the optical disk drive 25 via signal lines to control the operation of the optical disk drive. On the other hand, in order to identify a control signal transmitted from the other-function chip, a signal-processing device will transform the received control signal as a standard control signal of the ATAPI, so as to control the optical disk drive accordingly. Or by an applicable design, such as to set up another communication protocol for the other-function chip and the optical disk drive, the signal-processing device can recognize the control signal outputted from a standard interface and straightaway control the optical disk drive without the transformation procedure of the control signal.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a method by using other function chips, which have already existed in a computer, to replace the conventional optical disk drive control chip. By this way, the production cost is reduced.

The term, "other-function chips," refer to any essential chip, which is installed in the computer, with functions other than optical disk drive control. One typical example of the other-function chips is the keyboard microcontroller. The pins of the other-function chips are generally not fully utilized. For example, in one keyboard microcontroller, only about 10 out of the 50 pins are utilized. According to the invention, the idle pins of the other-function ship are used for optical disk drive control. Hence, the other-function chip is equipped with the function of optical disk drive control in addition to the originally predetermined function.

Figure 1:
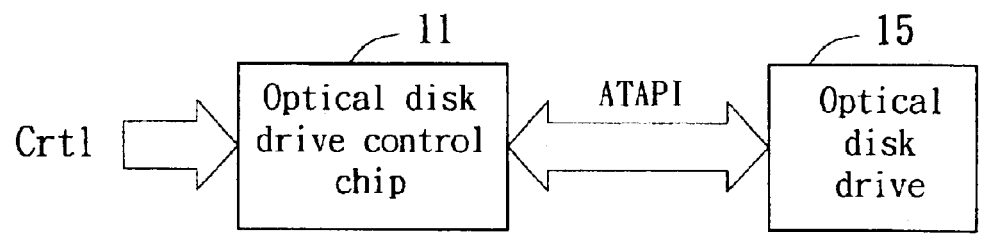
FIG. 1 (Prior Art) shows a block diagram of a conventional control method for the optical disk drive.
Figure 2:
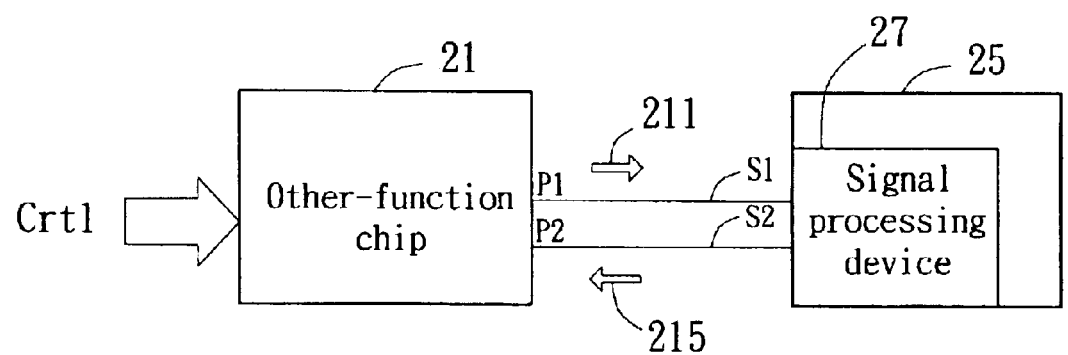
FIG. 2 shows a block diagram of a control method for the optical disk drive according to a preferred embodiment of the invention.

Referring to FIG. 2, a block diagram of a control method for the optical disk drive according to a preferred embodiment of the invention is shown. Pins P1 and P2 are examples of the idle pins of the other-function chip 21. The idle pins P1 and P2 are connected to an optical disk drive 25 via signal lines S1 and S2.

The operation of the optical disk drive 25 is described as follows. The control signal Ctrl from a user is first input to the other-function chip 21, and transmitted through the idle pins P1 and P2 by using an equipped interface, like a serial interface. The control signal Ctrl is then transmitted via the signal lines S1 and S2 to the optical disk drive 25. The control signal Ctrl is substantially received by the signal processing device 27 in the optical disk drive 25. In real application, the idle pin P1 can be set as a transmitter for sending out an output signal 211, and the idle pin P2 can be set as a receiver for receiving an input signal 215, vice versa.

As such, the control signal Ctrl can be transmitted between the other-function chip 21 and the optical disk drive 25 and thus operate the optical disk drive, simply by making use of the idle pins P1 and P2.

Furthermore, by using a keyboard microchip as an example of the other-function chip, the configuration of the notebook computer can be simplified. Additional keys conventionally installed on the housing of the notebook computer, used for supporting the Audio DJ function, can be omitted. According to the invention, the function of the additional keys supporting Audio DJ can be accomplished by the keys originally installed on the keyboard while the keyboard microchip is used as the other-function chip. In real application, keys originally on the keyboard can be designated as Hot-Keys for controlling the operation of the optical disk drive. For example, key "P" can be usually designated as the "Play/Pause" button; key "S" can be commonly designated to function as "Stop" button; and key "Esc" can be typically designated to operate like the "Eject" button. It is clear to anyone skilled in the art that the designation of Hot-Keys is mainly determined by personal preference. The designation of the above-mentioned Hot-Keys is only examples and should not be taken as limitation of the invention. To control the optical disk drive by the Hot-Keys and the keyboard microcontroller as the "other-function chip" is described as follows. The pressing of any of the Hot-Keys is first detected by the keyboard microcontroller. The corresponding Hot-Key signals, such as Play/Pause for key "P", "Stop" for key "S", and "Eject" for key "Esc', are transmitted through the idle pin P1 to the optical disk drive 25. The optical disk drive 25 then operates accordingly. In addition, the wake-up function of the keyboard can also be applied in the design of the invention. As such, a wake-up signal can be generated simply by pressing any key on the keyboard when the notebook computer is in a power-off state or in a power-saving mode (low-power suspend mode). After any key is pressed, the wake-up signal is outputted to the optical disk drive via the idle pin P1 in order to wake up the optical disk drive. After receiving the wake up signal, the optical disk drive is ready for operate according to the signals outputted from the Hot-Keys, which is very handy and convenient for users.

The signal processing device 27 may serve to converting the received control signal into a standard control signal compliant with the ATAPI standard, so as to control the optical disk drive accordingly. That is because the interface of the other-function chip 21 is not always compliant with the standard of the ATAPL Alternative ways, by setting up a protocol for the other-function chip and the optical disk drive or table lookup, the signal processing device 27 also enable the control signals from the standard interface to be detected without an additional signal transformation procedure.

The optical disk drive control apparatus as disclosed in the above-mentioned preferred embodiment replace the conventional specialized optical disk drive control chip by a ready-installed other-function chip. Thus, the cost of manufacturing is reduced and the competition potential of the product is enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disk drive control apparatus configured in a computer, wherein the computer comprises an optical disk drive and an other-function chip, and the other-function chip comprises a plurality of idle pins, the optical disk drive control apparatus comprising:
    a plurality of signal lines for connecting the idle pins of the other-function chip to the optical disk drive, wherein the other-function chin has a function of optical disk drive control in addition to an other-function which is originally predetermined; and
    a signal-processing device installed in the optical disk drive for detecting a control signal from the other-function chip, wherein the optical disk drive is controlled accordingly.

2. The optical disk drive control apparatus as claimed in claim 1, wherein the other-function chip is a keyboard microcontroller.

3. The optical disk drive control apparatus as claimed in claim 1, wherein the signal-processing device is used for converting the control signal to be compliant with the ATAPI standard.

4. The optical disk drive control apparatus as claimed in claim 1, wherein the control signal comprises an output signal and an input signal, the idle pin comprising:
    a first idle pin for outputting the output signal to the optical disk drive; and
    a second idle pin for receiving the input signal from the optical disk drive.

5. The optical disk drive control apparatus as claimed in claim 4, wherein the output signal can be a wake up signal for wakening up the optical disk drive.

6. The optical disk drive control apparatus as claimed in claim 4, wherein the output signal can be a Hot-Key signal for operating the optical disk drive.

7. The optical disk drive control apparatus as claimed in claim 6, wherein the Hot-Key signal comprises a play/pause signal.

8. The optical disk drive control apparatus as claimed in claim 6, wherein the Hot-Key signal comprises a stop signal.

9. The optical disk drive control apparatus as claimed in claim 6, wherein the Hot-Key signal comprises an eject signal.

10. An optical disk drive control apparatus configured in a computer, wherein the computer comprises an optical disk drive and a keyboard microcontroller, and the keyboard microcontroller comprises a plurality of idle pins, the optical disk drive control apparatus comprising:
    a plurality of signal lines for connecting the idle pins of the keyboard microcontroller to the optical disk drive, wherein the keyboard microcontroller has a function of optical disk drive control in addition to an other-function which is originally predetermined; and
    a signal-processing device installed in the optical disk drive for detecting a control signal from the keyboard microcontroller, wherein the optical disk drive is controlled-according to the control signal.

* * * * *